United States Patent
Awasthi et al.

(10) Patent No.: US 12,407,627 B2
(45) Date of Patent: Sep. 2, 2025

(54) SYSTEMS AND METHODS FOR CONSERVING COMPUTATIONAL RESOURCES BY REDUCING NETWORK TRAFFIC PREDICTIONS VIA MACHINE LEARNING MODELS

(71) Applicant: Capital One Services, LLC, McLean, VA (US)

(72) Inventors: Ateet Kumar Awasthi, McKinney, TX (US); Chris Fields, Roanoke, TX (US); Saral Jain, McKinney, TX (US); Matt Howarth, Garland, TX (US); Vedhasree Periathambi, Irving, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/424,509

(22) Filed: Jan. 26, 2024

(65) Prior Publication Data
US 2025/0247339 A1    Jul. 31, 2025

(51) Int. Cl.
G06F 15/173 (2006.01)
H04L 43/106 (2022.01)
H04L 43/16 (2022.01)
H04L 47/80 (2022.01)
H04L 47/83 (2022.01)

(52) U.S. Cl.
CPC .......... *H04L 47/83* (2022.05); *H04L 43/106* (2013.01); *H04L 43/16* (2013.01); *H04L 47/801* (2013.01)

(58) Field of Classification Search
None
See application file for complete search history.

(56) References Cited

U.S. PATENT DOCUMENTS

| | | | |
|---|---|---|---|
| 8,024,481 B2 | 9/2011 | Thornton et al. | |
| 10,291,537 B2 | 5/2019 | Alisawi et al. | |
| 11,411,889 B2 | 8/2022 | El Gamal et al. | |
| 11,689,944 B2 * | 6/2023 | Vasudevan | H04L 41/147 370/252 |
| 2012/0117233 A1 | 5/2012 | Hamilton et al. | |

(Continued)

OTHER PUBLICATIONS

Amazon Web Services, "Amazon Elastic Container Service: Developer Guide", 2024, pp. 728-731, Amazon Web Services. https://docs.aws.amazon.com/AmazonECS/latest/developerguide/service-auto-scaling.html.

*Primary Examiner* — Phuoc H Nguyen
(74) *Attorney, Agent, or Firm* — Foley & Lardner LLP

(57) ABSTRACT

In some embodiments, conserving computational resources by reducing network traffic predictions via machine learning models may be facilitated. In some embodiments, in connection with a first scheduled time for automated triggering of network resource predictions via a first machine learning model at scheduled times, a first resource usage prediction is received, via the first machine learning model, for a service executing within a computing environment. A first resource allocation process is performed for the service based on the first resource usage prediction. In connection with detecting that an amount of actual traffic corresponding to the service satisfies a traffic threshold for a threshold amount of time, a second resource allocation process is performed, before a second scheduled time next in the scheduled times after the first scheduled time.

20 Claims, 4 Drawing Sheets

(56) References Cited

U.S. PATENT DOCUMENTS

| | | | | |
|---|---|---|---|---|
| 2014/0344391 A1* | 11/2014 | Varney | ............... | H04L 47/822 |
| | | | | 709/213 |
| 2016/0321115 A1* | 11/2016 | Thorpe | ............... | G06F 11/3409 |
| 2018/0041447 A1 | 2/2018 | Dintenfass et al. | | |
| 2020/0007620 A1* | 1/2020 | Das | ............... | H04L 67/62 |
| 2021/0377804 A1* | 12/2021 | Sivaraj | ............... | H04W 76/15 |
| 2022/0045929 A1* | 2/2022 | Guim Bernat | ............... | H04L 45/125 |
| 2022/0164699 A1 | 5/2022 | Neupane et al. | | |
| 2022/0368648 A1* | 11/2022 | Ramamurthy | ............... | H04L 47/76 |
| 2023/0071281 A1* | 3/2023 | Tariq | ............... | H04L 43/0882 |
| 2023/0260045 A1 | 8/2023 | Nawab et al. | | |
| 2024/0267792 A1* | 8/2024 | Zhu | ............... | H04W 28/0236 |
| 2024/0340939 A1* | 10/2024 | Chang | ............... | H04L 47/83 |

* cited by examiner

SYSTEMS AND METHODS FOR CONSERVING COMPUTATIONAL RESOURCES BY REDUCING NETWORK TRAFFIC PREDICTIONS VIA MACHINE LEARNING MODELS

SUMMARY

Methods and systems are described herein for improvements related to facilitating cloud computing system resource allocations. As one example, methods and systems are described herein for conserving computational resources by reducing network traffic predictions via machine learning models facilitating cloud computing system resource allocations.

Existing cloud computing systems often statically allocate resources for services executing within a cloud computing environment on a periodic basis or other automated schedule, such as automatically scaling the amount of resources required for a given service, to accommodate the dynamic nature of network traffic. For example, cloud computing systems may periodically predict the amount of network traffic of a given service and update an amount of resources for the service based on the prediction. Although greater frequency of scheduled predictions and resource allocations increase the likelihood that the appropriate amount of resources are allocated to respective services, such frequent predictions and allocations may consume substantially more resources than necessary. The foregoing problem is further exacerbated when the predictions and resource allocations are performed with computationally-intensive models (e.g., large machine learning models). For example, network traffic predictions may depend on a variety of factors, such as time of day, seasonal trends, the given service for which the prediction is made, the availability of the service, or other factors that increase the number of dimensions of input parameters to be considered for network traffic prediction. As the number of dimensions increase, so does the amount of computational resources for generating network traffic predictions and reallocating resources.

Moreover, in connection with performing resource allocations solely based on network traffic predictions at traditionally scheduled times, cloud computing systems frequently suffer from inadequate resource allocation instances. While scheduled network traffic predictions and resource allocation mechanisms allow periodic checks on the amount of resources required by a given service at a given time, existing systems fail to account for network traffic surges that may occur in between such predictions. For example, when a given service experiences a network traffic surge in between scheduled network traffic predictions (and resource allocation processes), the resources allocated to a given service may be inadequate to effectively execute the service, thereby leading to increased network latency times and a poor user experience.

To overcome these technical challenges described above, in some embodiments, dynamic resource allocation processes may be implemented. For example, prior to a next scheduled interval of an automated periodic triggering of network traffic predictions via a machine learning model, the system may perform an additional resource allocation process for a network service based on a detected amount of actual network traffic satisfying a network traffic condition (e.g., a threshold network traffic condition associated with an initial network traffic prediction). As discussed above, existing systems currently perform resource allocation processes statically (e.g., merely based on automated periodic triggering of network traffic predictions), which may leave network services susceptible to underfunded resources and forces network traffic predictions to be generated whether necessary or not. Not only may the service experience high latency, lag, or even crash if an inadequate amount of resources are allocated to the service during the time when network traffic has surged, but these existing systems have no mechanism to reallocate such resources until the next scheduled network traffic prediction, thereby leading to a decrease in network service performance. As such, by actively monitoring actual network traffic experienced by a service between scheduled intervals of network traffic predictions, the system may conserve computational resources by reducing network traffic predictions or resource allocations to instances where the actual amount of network traffic satisfies one or more network traffic conditions (e.g., via rule-based monitoring techniques that utilizes significantly less resources compared to machine learning models typically used to facilitate periodic resource allocations).

In some embodiments, in connection with a first scheduled time for automated triggering of network resource predictions via a first machine learning model, the system may perform a first resource allocation process for a service based on a first resource usage prediction for the service. For instance, the first resource allocation process may allocate a set of resources, such as virtual machine instances, container instances, computing clusters, tasks, or other resources based on a predicted amount of resources that will be used by the service. If the system detects that the service's actual traffic satisfies a traffic threshold for a threshold amount of time, the system may perform a second resource allocation process for the service before the next scheduled time. The second resource allocation process may include allocating an additional set of resources to the service or remove unnecessary resources from the service. The traffic threshold may be a lower bound or an upper bound of an initial network traffic prediction. In this way, when a network traffic surge (or a network traffic drop) is detected, the system may perform the second resource allocation process for the service. In this way, for example, the system conserves computational resources expended by network traffic predictions by avoiding use of the machine learning model to derive network traffic predictions in between the scheduled periodic network traffic predictions (e.g., via simpler rule-based active monitoring techniques or other computationally-inexpensive monitoring techniques). Additionally, or alternatively, the system conserves computational resources by efficiently allocating resources to the service based on real-time (or near real-time) network traffic surges or drops.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
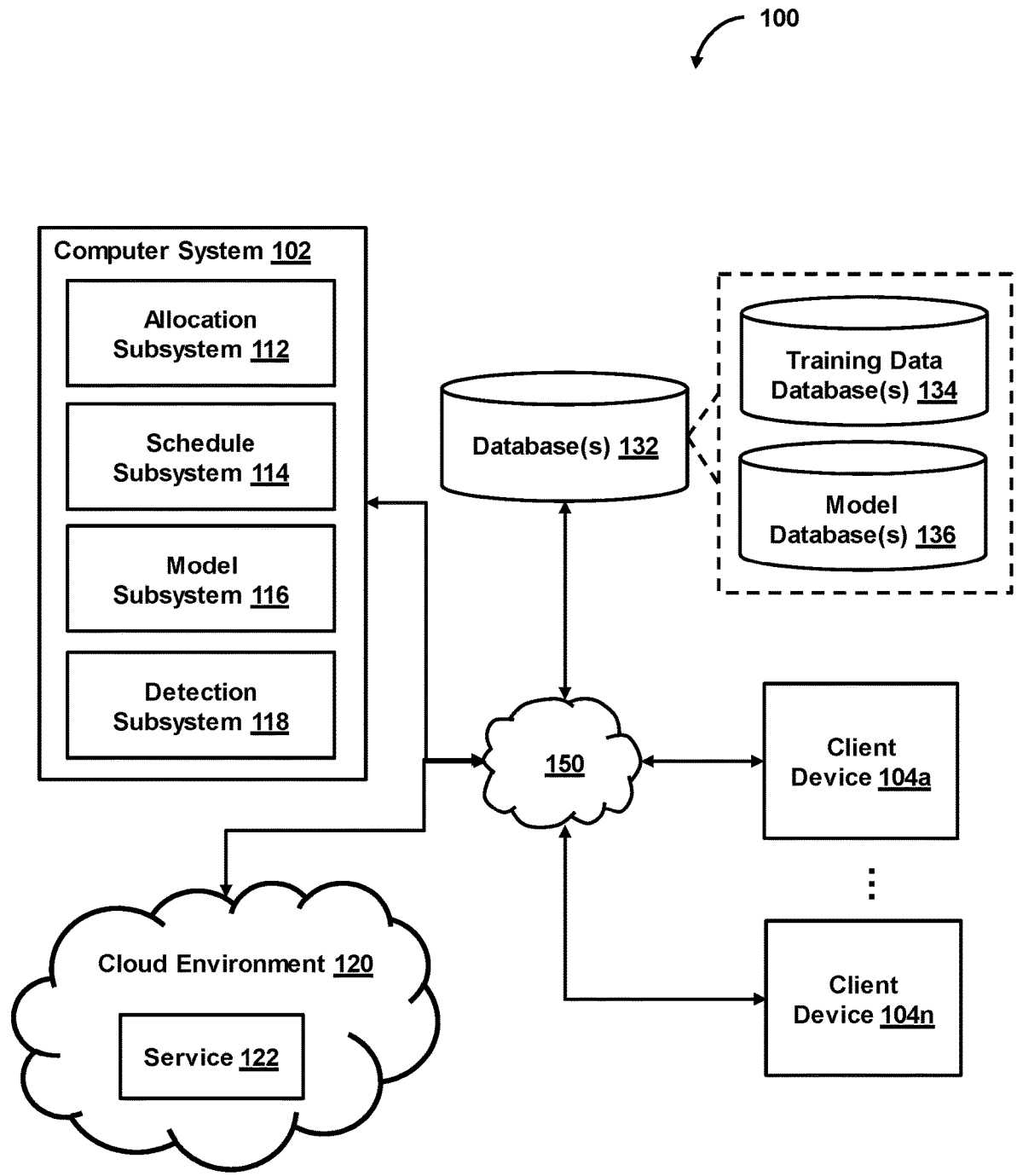
FIG. 1 shows a system for dynamically allocating resources for a service, in accordance with one or more embodiments.

FIG. 1 shows a system 100 for dynamically allocating resources for a service, in accordance with one or more embodiments. As shown in FIG. 1, system 100 may include computer system 102, client device 104 (or client devices 104a-104n), cloud environment 120, or other components. Computer system 102 may include allocation subsystem 112, schedule subsystem 114, model subsystem 116, detection subsystem 118, or other components. Cloud environment 120 may include service 122. Cloud environment may be any cloud computing system that may host one or more service(s) 122. For example, service 122 may be any service that a cloud environment 120 is to host. For instance, service 122 may be a software application executing within cloud environment 120. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104. As another example, while computer system 102 is shown separate from cloud environment 120, computer system 102 may be part of cloud environment 120. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, system 100 may perform resource allocation for a service based on detecting that the actual network traffic associated with the service satisfies one or more network traffic conditions. As an example, the service may execute within a computing environment, such as a cloud computing environment or other computing environment. The service may be related to a software application executing in the computing environment, such as a portion of a software application (e.g., where a software application is composed of one or more portions), the software application itself, a microservice, one or more tasks, or other software-related functionalities.

For example, prior to a next scheduled time for the next traffic prediction for a service via a machine learning model, system 100 may perform an additional resource allocation process for the service in response a detected amount of actual network traffic satisfying one or more network traffic conditions (e.g., a threshold network traffic condition associated with an earlier network traffic prediction by the machine learning model for a current time period). If, however, the detected amount of actual network traffic does not satisfy such network traffic conditions, system 100 may avoid performing the additional resource allocation process.

In some embodiments, in connection with a first scheduled time for automated triggering of network resource predictions via a first machine learning model at scheduled times, system 100 may perform a first resource allocation process for a service based on a first resource usage prediction obtained for the service via the first machine learning model. For example, the first machine learning model may be triggered to perform resource usage predictions for the service at scheduled times. The first resource allocation process may include allocating a set of resources to the service. The set of resources may include infrastructure resources (e.g., virtual machines, container instances, tasks), network infrastructure (e.g., load balancers, firewalls, routing configurations), storage resources (e.g., databases, database servers, object storage, block storage, file storage), security resources (e.g., identify and access management, encryption, firewalls and security groups), monitoring and logging resources, scaling resources, or other resources. As an example, system 100 may allocate a set of instantiated tasks to the service.

Prior to a second scheduled time for the automated triggering of network resource predictions, system 100 may detect that an amount of actual traffic corresponding to the service satisfies a traffic threshold. For example, system 100 may actively monitor actual network traffic experienced by the service and determine whether the amount of actual traffic satisfies the traffic threshold for a threshold amount of time. The traffic threshold may be a dynamic traffic threshold amount that is related to the earlier first resource usage prediction for the service. For instance, the traffic threshold may be an upper or lower bound of a level of predicted network traffic of the first resource usage prediction. The threshold amount of time may be a predetermined time amount to ensure that an unnecessary dynamic resource allocation process is prevented from being effectuated until the system verifies that the actual amount of network traffic satisfies the traffic threshold, thereby conserving computational resources involved in resource allocation processes.

In connection with detecting that the amount of actual traffic satisfies the traffic threshold for the threshold amount of time, system 100 may perform a second resource allocation process for the service before the second schedule time for the automated trigger of network resource predictions. For example, by first verifying that the amount of actual traffic satisfies the traffic threshold for the threshold amount of time, the system may perform the second resource allocation process when necessary as opposed to waiting until the next scheduled time in the scheduled times of the automated triggering of network resource predictions and may conserve computational resources involved in the resource allocation process. Moreover, by actively monitoring the amount of actual network traffic as opposed to merely waiting until the next scheduled time to perform a resource allocation process, the system may ensure that the service is properly allocated with required resources (e.g., in real-time or near real-time) when network traffic surges or drops occur, thereby increasing computational resource allocation efficiency.

Subsystems 112-118

In some embodiments, in connection with a first scheduled time for automated triggering of network resource predictions via a first machine learning model at scheduled times, allocation subsystem 112 may receive a first resource usage prediction for a service executing within a computing environment. As discussed above, the service may be any service that is related to a software application. For instance, the service may be a portion of a software application (e.g., where a software application is composed of one or more portions), a software application itself, a microservice, one or more tasks, or other software-related functionalities. The service may execute within a computing environment. For example, the service (e.g., service 122) may execute within cloud environment 120, which may be a cloud computing environment.

Cloud environment 120 may be a cloud computing system environment that provides one or more services, hosts one or more services, or is otherwise related to one or more services. For example, cloud environment 120 may be a cloud computing environment that provides infrastructure as a service (IaaS), platform as a service (PaaS), software as a service (SaaS), function as a service (FaaS), containerization services, edge computing, or other services or functionalities. Cloud environment 120 may provide such functionalities to enable users (e.g., developers) to develop, publish, manage, and control software applications (e.g., services) without the need for the developer's own physical architecture. While cloud environment 120 is described as a cloud computing environment, it should be noted that cloud environment 120 may be any computing environment and is not merely limited to cloud-based architectures, in accordance with one or more embodiments.

Figure 2:
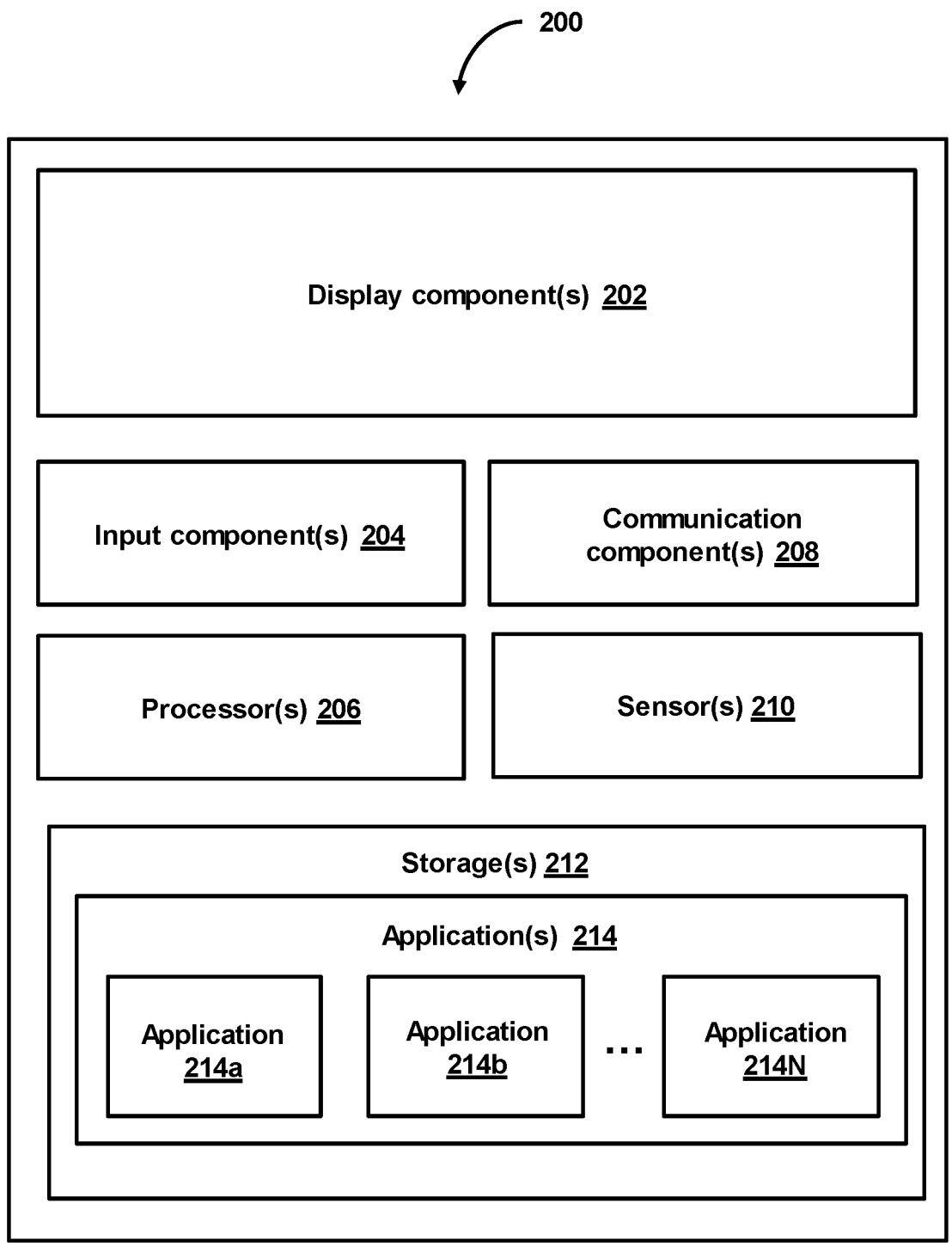
FIG. 2 shows an illustrative diagram of one or more components of a user device, in accordance with one or more embodiments.

In some embodiments, with respect to FIG. 2, one or more operations related to dynamically allocating resources for a service may be performed by client device 200. For example, one or more components or subsystems of computer system 102 (FIG. 1) may be accessible or part of client device 200. In some embodiments, client device 200 may correspond to client device 104 (FIG. 1). Client device 200 may include a plurality of components, such as display component(s) 202, input component(s) 204, processor(s) 206, communication component(s) 208, sensor(s) 210, storage(s) 212, application(s) 214, or other components. In some embodiments, storage 212 may store a variety of applications. For example, applications 214a-214n may represent different applications stored on client device 200. Application 214a may be an application that is configured as a web browser to interact with one or more services (e.g., service 122) over network 150. It should be noted that "client device" and "user device" may be used interchangeably and may refer to one or more of the same devices or one or more different devices, based on context of the discussion. For example, a user (e.g., an end user, a developer, etc.) may use client device 200 to access a software application (e.g., service 122) that executes within cloud environment 120.

Allocation subsystem 112 may receive the first resource usage prediction for a service (e.g., service 122) executing within a computing environment (e.g., cloud environment 120) based on a scheduled automated triggering of the first resource usage prediction. For example, schedule subsystem 114 may store information indicating one or more scheduled times for triggering machine learning model network resource predictions. The information indicating one or more scheduled times for triggering a machine learning model to generate network resource predictions may be predetermined times (e.g., secondly, minutely, hourly, daily, weekly, monthly, yearly, etc.). Schedule subsystem 114 may trigger (e.g., automatically), based on a scheduled time period, model subsystem 116 to generate a machine learning model prediction indicating a first resource usage prediction for a service.

The resource usage prediction for a service may be related to an amount of resources that is to be used with respect to the service 122. For example, the resource usage prediction may indicate an amount of network traffic that will be experienced by the service 122, an amount of resources that the service 122 will be using, which resources the service 122 will need to execute, an expected resource that the service 122 requires, a resource that the service 122 does not need, a number of resources that the service 122 does not need, or other resource usage-related prediction with respect to the service 122. For example, the resource prediction may indicate a number of, an expected usage of, a need for, or no need for infrastructure resources (e.g., virtual machines, container instances, tasks), network infrastructure (e.g., load balancers, firewalls, routing configurations), storage resources (e.g., databases, database servers, object storage, block storage, file storage), security resources (e.g., identify and access management, encryption, firewalls and security groups), monitoring and logging resources, scaling resources, or other resources. In some embodiments, the resource usage prediction may be network traffic predictions. For example, as the usage of resources associated with service 122 may depend on, or correlate to, network traffic, the system may perform network traffic predictions for the service 122 to determine whether to cause a resource allocation process to occur. The network traffic prediction may be a value (e.g., an integer, decimal, hexadecimal, alphanumeric string, numeric string, character string, percentage, ratio, etc.) that indicates an amount of network traffic received at service 122 or related to service 122.

In some embodiments, the resource usage prediction may be for a given time period. For example, the resource usage prediction may be a resource usage prediction that predicts resource usage in between the scheduled times of the automated triggering of network resource predictions. In this way, the system may generate up-to-date resource predictions for a given service. In some embodiments, the resource usage prediction may be based on the service. For example, the first machine learning model may be provided with a service identifier (e.g., an alphanumeric string, an integer, a character string, etc.) that identifies the given service (e.g., service 122). Additionally or alternatively, the first machine learning model may be provided with a timestamp (e.g., of the scheduled time) to generate the resource usage prediction. In this way, the machine learning model may be provided with identifying information and a specific time at which the prediction is to be generated to provide accurate resource predictions for a service.

In some embodiments, model subsystem 116 may be triggered to generate a resource usage prediction at a first scheduled time (e.g., indicated by schedule subsystem 114)

for service 122. Model subsystem 116 may access one or more machine learning models for generating resource usage predictions for services. For example, model subsystem 116 may access model database 136 to obtain a machine learning model configured for generating resource usage predictions, may access training data database 134 for training data pertaining to training machine learning models to predict resource usage predictions, or may access one or more pre-stored/pre-trained machine learning models from model subsystem 116 itself.

In some embodiments, model subsystem 116 may train or configure one or more artificial intelligence models to facilitate one or more embodiments described herein. Such models may be used to generate resource usage predictions for a service. As an example, such models may be trained or configured to perform the foregoing functions by respectively, mutually mapping input data and output data in nonlinear relationships based on learning (e.g., deep learning).

In some embodiments, the artificial intelligence models (otherwise known as prediction models) may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function that combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Figure 3:
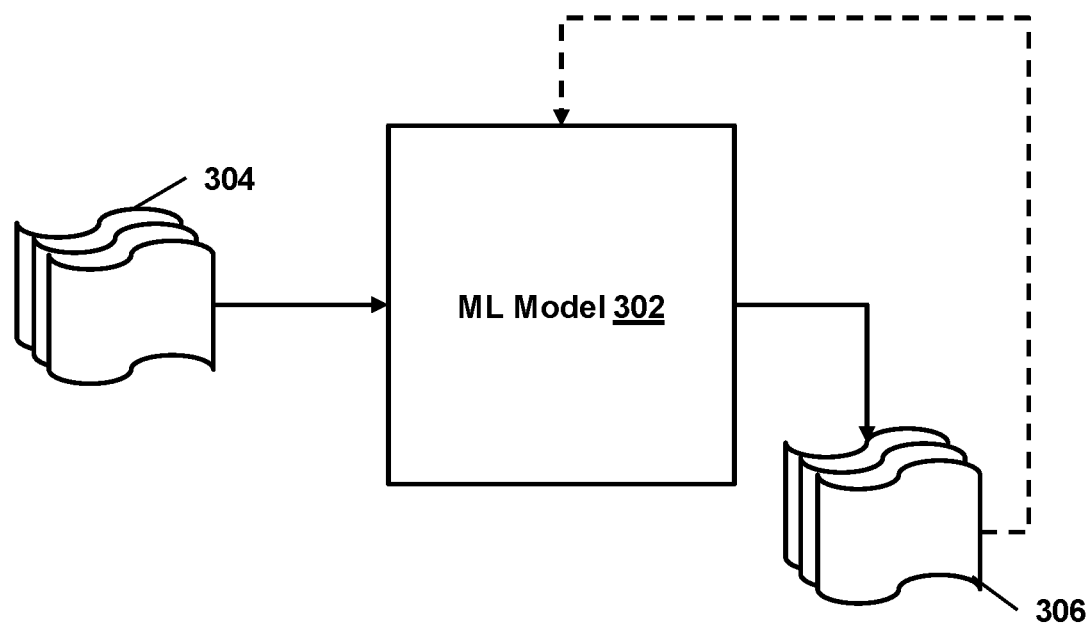
FIG. 3 shows an artificial intelligence model configured for generating resource usage predictions, in accordance with one or more embodiments.

As an example, with respect to FIG. 3, machine learning model 302 may take inputs 304 and provide outputs 306. In one use case, outputs 306 may be fed back to machine learning model 302 as input to train machine learning model 302 (e.g., alone or in conjunction with user indications of the accuracy of outputs 306, labels associated with the inputs, or with other reference feedback information). In another use case, machine learning model 302 may update its configurations (e.g., weights, biases, or other parameters) based on its assessment of its prediction (e.g., outputs 306) and reference feedback information (e.g., user indication of accuracy, reference labels, or other information). In another use case, where machine learning model 302 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 302 may be trained to generate better predictions.

As an example, where the prediction models include a neural network, the neural network may include one or more input layers, hidden layers, and output layers. The input and output layers may respectively include one or more nodes, and the hidden layers may each include a plurality of nodes. When an overall neural network includes multiple portions trained for different objectives, there may or may not be input layers or output layers between the different portions. The neural network may also include different input layers to receive various input data. Also, in differing examples, data may input to the input layer in various forms, and in various dimensional forms, input to respective nodes of the input layer of the neural network. In the neural network, nodes of layers other than the output layer are connected to nodes of a subsequent layer through links for transmitting output signals or information from the current layer to the subsequent layer, for example. The number of the links may correspond to the number of the nodes included in the subsequent layer. For example, in adjacent fully connected layers, each node of a current layer may have a respective link to each node of the subsequent layer, noting that in some examples, such full connections may later be pruned or minimized during training or optimization. In a recurrent structure, a node of a layer may be again input to the same node or layer at a subsequent time, while in a bi-directional structure, forward and backward connections may be provided. The links are also referred to as connections or connection weights, as referring to the hardware implemented connections or the corresponding "connection weights" provided by those connections of the neural network. During training and implementation, such connections and connection weights may be selectively implemented, removed, and varied to generate or obtain a resultant neural network that is thereby trained and that may be correspondingly implemented for the trained objective, such as for any of the above example recognition objectives.

In some embodiments, model subsystem 116 may receive training data to train an artificial intelligence model. For example, model subsystem 116 may receive training data from training data database 134, which may include (i) training service identifiers (e.g., identifiers indicating a given service), (ii) training routine resource identifiers (e.g., identifiers indicating a given resource, such as a virtual machine instance, load balancer, etc.), or (iii) training routine historical network traffic (e.g., an amount of network traffic at a given date/time for a given service), historical resource usage predictions, or other information. Such training data may be provided as input (e.g., inputs 304) to the artificial intelligence model (e.g., machine learning model 302) during a training routine to train the artificial intelligence model, which may generate outputs 306. Outputs 306 may indicate a resource usage prediction for a service. For example, outputs 306 may indicate an amount of network traffic associated with the service, an amount of required resources needed by the service, a given resource the service no longer needs, or other resource usage prediction. In some embodiments, outputs 306 may be compared to ground truth data (e.g., a correct output, labels indicating a correct resource usage prediction, etc.) to be provided back to machine learning model 302 as reference feedback information to further train machine learning model 302.

Referring back to FIG. 1, in one use case, in connection with automated periodic triggering of network traffic predictions via a first machine learning model at scheduled intervals, allocation subsystem 112 may receive, via a first machine learning model (e.g., from model subsystem 116), an initial network traffic prediction for a network service (e.g., service 122). In some embodiments, allocation subsystem 112 may perform a first resource allocation process for the service based on the first resource usage prediction (e.g., the initial network traffic prediction). For example, the first resource allocation process may allocate a set of resources to the service, such as a set of instantiated tasks to the network service to be instantiated within cloud environment 120.

To provide an enhanced user experience related to cloud-based software applications, the system can perform resource allocation processes based on the first resource usage prediction. For example, the system can leverage an initial network traffic prediction for a given service (e.g., indicating a predicted amount of network traffic that the service will experience over a given time period) to ensure that the correct amount of resources is deployed to a computing environment, such as cloud environment 120 for service 122. In some embodiments, the system may allocate (e.g., add, remove, maintain, etc.) resources for the service based on the initial traffic prediction. For example, allocation subsystem 112 may allocate a number of resources of the set of resources to execute on one or more virtual machines associated with the service. For instance, allocation subsystem 112 may allocate a number of tasks to be instantiated within cloud environment 120 for the service. As discussed above, tasks may refer to instances of a software application (or portions thereof) to be used by or with a service. Where the initial traffic prediction exceeds a threshold amount, allocation subsystem 112 may increase a maximum number of tasks by one, causing a new task to be added to the service.

For example, as cloud environments (e.g., cloud environment 120) may host a variety of services (e.g., service 122), each service 122 may be associated with a maximum and minimum number of tasks that can be instantiated on one or more computing clusters (e.g., virtual machine clusters) within cloud environment 120. To ensure that services may run efficiently, allocation subsystem 112 may allocate a set of tasks for the service based on the initial traffic prediction. For example, allocation subsystem 112 may decrease the minimum number of tasks by one when a level of traffic fails to meet or exceed a threshold amount of network traffic or can increase the maximum number of tasks by one when a level of traffic fails to meet or exceed a threshold amount of network traffic.

In some embodiments, detection subsystem 118 may detect that an amount of actual traffic corresponding to the service satisfies a traffic threshold for a threshold amount of time. For example, the threshold amount of time may be a time period respective to an initial network traffic prediction corresponding to the receiving of the first resource usage prediction for the service. As an example, the threshold amount of time may be a predetermined time amount such as one minute, two minutes, three minutes, 10 minutes, 15 minutes, 30 minutes, one hour, two hours, or other time amount. The threshold amount of time may begin to "run" when the initial network traffic prediction is received. For example, the detection subsystem may detect whether an amount of actual network traffic corresponding to the service satisfies a traffic threshold for a threshold amount of time starting at the reception of the initial network traffic prediction.

In some embodiments, the traffic threshold may be a value associated with a maximum amount (e.g., an upper bound) of the predicted network traffic of the initial network traffic prediction. For example, the initial network traffic prediction (or the first resource usage prediction) may indicate range of network traffic to be experienced by the service during the time period between the first scheduled time (of the set of automated triggered times for network traffic predictions) and the next scheduled time. Therefore, the initial network traffic prediction may indicate a range of network traffic to be experienced between scheduled times of the automated triggering of network resource predictions via the first machine learning model. When the actual amount of network traffic experienced at the service is above the maximum value of predicted traffic, the system may determine that the actual amount of network traffic satisfies the threshold network traffic value. In this way, the system may trigger a resource allocation process to occur to increase the amount of tasks associated with the service, thereby reducing network latency and lag caused by overloaded resources for the service.

In some embodiments, the traffic threshold may be a value that may be associated with a minimum amount (e.g., a lower bound) of the predicted network traffic of the initial network traffic prediction. For example, when the actual amount of network traffic experienced at the service is below the minimum value of predicted traffic, the system may determine that the actual amount of network traffic satisfies the threshold network traffic value. In this way, the system may trigger a dynamic computational resource allocation process to occur to reduce the amount of tasks executing within the computing system environment—thereby conserving computational resources executing within the computing system environment to support the service.

In one use case, for example, where the traffic threshold is an upper bound of the initial network traffic prediction and the threshold time period is five minutes, detection subsystem 118 may detect that an amount of actual traffic corresponding to the service satisfies the traffic threshold for the threshold amount of time when there is a 20% difference of the upper bound of the initially predicted network traffic as compared to the actual network traffic for a time period of five minutes.

In some embodiments, the detection subsystem 118 may detect, prior to a next scheduled interval of the automated periodic triggering, whether an amount of actual network traffic experienced by the service (i) exceeds an upper bound of the initial network traffic prediction and (ii) continuously satisfies a relative traffic threshold for a threshold time period. For example, the relative traffic threshold may be a different parameter from the upper bound and is relative to the initial network traffic prediction. To further verify whether a resource allocation process is needed with respect to a given service, detection subsystem 118 may first determine whether the actual network traffic experienced by the service exceeds an upper bound of the initial network traffic prediction (or alternatively, fails to meet or exceed a lower bound of the initial network traffic prediction). Detection subsystem 118 may also detect whether the amount of actual network traffic experienced by the network services continuously satisfies relative traffic threshold for a threshold time period. For example, the relative traffic threshold may be a ratio, a percentage, a range, or other value that is relative to the initial network traffic prediction. For example, the relative traffic threshold may be a 20% difference between the initial network traffic prediction and the actual amount of network traffic. As another example, the relative traffic threshold may be a fixed value (e.g., 50,000 bits per second) difference that is between the initial network traffic prediction and the actual network traffic being experienced at the service. In this way, the system may verify that a network traffic anomaly has occurred but also ensure that the network traffic anomaly is sustained (e.g., continuing to occur), thereby preventing unnecessary resource allocation processes from occurring.

In some embodiments, in connection with detecting that the amount of actual traffic satisfies the traffic threshold for the threshold amount of time, allocation subsystem 112 may perform, before a second scheduled time next in the scheduled times after the first scheduled time, a second resource allocation process for the service. For example, the second resource allocation process may allocate an additional set of resources to the service. The additional set of resources to the service, in some embodiments, may be adding resources for the service or removing resources for the service.

For example, in response to an amount of actual traffic exceeding an upper bound of the initial network traffic prediction and continuously satisfying a relative traffic threshold for the threshold time period, model subsystem 116 may execute a machine learning model to generate a new network traffic prediction for the network service. Allocation subsystem 112 may perform a second task allocation process for the network service based on the new network traffic prediction. For example, the new network traffic prediction may be generated in between scheduled intervals of the automated periodic triggering of network traffic predictions via the first machine learning model. In some embodiments, the machine learning model generating the new network traffic prediction may be a different machine learning model from that of the first machine learning model that generated the initial network traffic prediction. In other embodiments, the machine learning model generating the new network traffic prediction may be the same machine learning model that generated the initial network traffic prediction. By generating a new network traffic prediction for the network service in between scheduled intervals, the system may accurately determine which resources to allocate to the network service based on the amount of network traffic. Additionally, in some embodiments, the machine learning model may not execute to generate the new network traffic prediction in response to the amount of actual network traffic failing to (i) exceed the upper bound of the initial network traffic prediction and (ii) continuously satisfy the relative traffic threshold for the threshold time period. In this way, the system may conserve computational resources involved with generating new network traffic predictions.

In some embodiments, the second task allocation process may increase the amount of resources that are executing within a computing environment. For example, the allocation subsystem 112 may parse event logs associated with the service to determine whether a first number of resources (e.g., instantiated tasks) executing within the computing environment matches a second number of resources (e.g., instantiated tasks). The event log may be a container-system log (e.g., from a container management system) that logs changes to tasks executing on one or more virtual machines within a computing cluster of virtual machines executing within the computing environment, such as a cloud computing environment, or may be other event logs that are associated with the service. The system may determine whether a desired number of resources (e.g., tasks, containers executing a software application, or a microservice of a software application) matches a maximum number of resources for a given service (e.g., of a software application). The maximum number of resources may be a predetermined maximum number of resources. In response to the desired number of resources matching the maximum number of resources, the system may increase, or otherwise update, the maximum number of resources by one to execute within the computing environment. In this way, the system can scale, in real time, the amount of maximum resources to ensure that the software application is prevented from being overloaded, thereby reducing computing system downtime. Additionally or alternatively, in response to the desired number of resources matching the maximum number of resources, the system may also add a new resource to the service, thereby improving the user experience via ensuring that a software application is not overloaded by high amounts of network traffic.

In some embodiments, the second task allocation process may decrease a minimum number of resources executing within a computing environment. For example, the system may parse event logs associated with the service to determine whether a first number of resources (e.g., tasks) executing within the computing environment is (i) less than a second number of resources (e.g., tasks) and (ii) is greater than one. For instance, the system may determine whether a desired number of tasks (e.g., containers executing a software application, or a microservice of a software application) is less than the minimum number of tasks for a given service (e.g., of a software application and that the desired number of tasks is at least greater than one. In response to the desired number of resources being less than the minimum number of resources and the desired number of resources being greater than one, the system may decrease the minimum number of resources by one. In this way, the system can scale, in real time, the amount of minimum resources, thereby conserving computational resources of the computing environment. Additionally or alternatively, in response to the desired number of resources being less than the minimum number of resources and the desired number of resources being greater than one, the system may remove a resource associated with the service to further conserve computational resources of the computing environment. Moreover, in some embodiments, the system may, in response to performing the second task allocation process, may skip the next scheduled resource usage (e.g., network traffic prediction). For example, to conserve the amount of computational resources, the system may skip (or otherwise forgo) the next scheduled resource usage prediction since resources have recently been allocated. In this way, the system may strike a balance between the computationally intensive process of generating resource usage predictions and allocating computational resources.

In some embodiments, allocation subsystem 112 may prevent a resource allocation process from occurring until a scheduled time. For example, allocation subsystem 112 may parse event logs associated with the service to determine whether a first resource of the set of resources executing within the computing environment satisfies a threshold time range. For instance, the system may determine whether a given task has been recently deployed (e.g., within one minute, within two minutes, etc.). For example, allocation subsystem 112 may determine whether the given task has been deployed within five minutes of detecting that the amount of actual traffic satisfies the traffic threshold for the threshold amount of time. In response to determining that a given resource (e.g., task) has been recently deployed, the system may prevent the second resource allocation process from being performed until the next scheduled time of the set of scheduled times of the automated periodic triggering of network resource usage predictions. For example, as newly added tasks may cause network traffic changes experienced at the service due the availability or unavailability of network resources, prior to automatically reallocating computing system resources, the system may take no action or will wait until the next scheduled time to perform a reallocation of computational resources for the computing environment. In this way, the system can reduce the amount of computational resource reallocation instances, thereby conserving computational resources (e.g., computer memory and processing power) required to reallocate computational resources for computing systems.

In some embodiments, the allocation subsystem 112 may prevent a resource allocation process from occurring until a scheduled time based on a number of resources. For example, the allocation subsystem 112 may parse event logs associated with the service to determine whether a first resource of the set of resources executing within the computing environment satisfies a threshold time range. For example, allocation subsystem 112 may determine whether a given task that is executing within the cloud computing environment has been recently deployed (e.g., within one minute, within two minutes, etc.) with respect to detecting that the amount of actual traffic satisfies the traffic threshold for the threshold amount of time. In response to determining that a given resource (or that any resource of the set of resources executing within the computing environment) has not been recently deployed, allocation subsystem 112 may further determine, based on the parsing of the log files, whether a first amount of resources is less than a second number of resources executing within the computing environment. For instance, the system may determine whether an amount of desired tasks is less than the maximum number of tasks. In response to determining that the first amount of resources is less than the second number of resources, allocation subsystem 112 may prevent the second resource allocation process from being performed until the next scheduled time of the set of scheduled times of the automated periodic triggering of network resource usage predictions. For example, if no tasks that are executing within the computing environment have been recently added and the desired number of tasks (e.g., the number of tasks executing within the computing environment) is less than a maximum number of tasks, prior to automatically reallocating computing system resources, allocation subsystem 112 may take no action or will wait until the next scheduled time to perform a reallocation of computational resources for the computing environment. In this way, the system can reduce the amount of computational resource reallocation instances, thereby conserving computational resources (e.g., computer memory and processing power) required to reallocate computational resources for computing systems.

In some embodiments, the second resource allocation process may use a resource usage prediction. For example, model subsystem 116 may provide (i) a first timestamp associated with a time at which the detection occurred (e.g., the time at which detecting that the amount of actual traffic corresponding to the service satisfies the traffic threshold for the threshold amount of time) and (ii) a service identifier associated with the service to a second machine learning model to generate a second resource usage prediction for the service executing within the computing environment. The second machine learning model may be the same machine learning model that provided the initial network traffic prediction (or first resource usage prediction), or may be a different machine learning model. For example, the first machine learning model may be a machine learning model trained on a variety of historical network traffic information involving multiple services. In this way, the system may use a generalized model to provide the second resource usage prediction, thereby reducing the utilization of computational resources involved with generating specific machine learning models to generate resource usage predictions for various services executing within a computing environment.

In other embodiments, however, the second machine learning model may be a machine learning model that is trained on historical network traffic information involving a specific resource (e.g., the resource for which the first resource usage prediction was generated). In this way, the system may generate more accurate network traffic predictions as the machine learning model may be custom tailored to specific trends of resource usage predictions for a service.

The second resource usage prediction may be for a second time period that is less than the first time period. For example, the second resource usage prediction may be for a shorter time period than that of the first resource usage prediction for the service. Where the first resource usage prediction is for a time duration between the first and second scheduled times (e.g., 12 hours), the second resource usage prediction may be for two hours (e.g., to obtain how much network traffic the service will experience within the next two hours, to obtain an amount of resources required for the service within the next two hours, etc.). In this way, the system may reduce the utilization of computational resources associated with generating large-scale resource usage predictions (e.g., as the machine learning model may require more computer processing power to generate predictions for larger times).

The detection subsystem 118 may then determine whether a second amount of actual network traffic corresponding to the service satisfies the traffic threshold for the threshold amount of time. For example, the detection subsystem 118 may determine whether the amount of actual network traffic experienced by the service is greater than or equal to the traffic threshold for a period of five minutes. In connection with detecting that the second amount of actual traffic satisfies the traffic threshold for the threshold amount of time, allocation subsystem 112 may perform a third resource allocation process for the service. In this way, the system may use a new resource usage prediction to base computational resource allocation processes on, thereby providing more accurate and robust resource allocation processes.

Example Flowcharts

Figure 4:
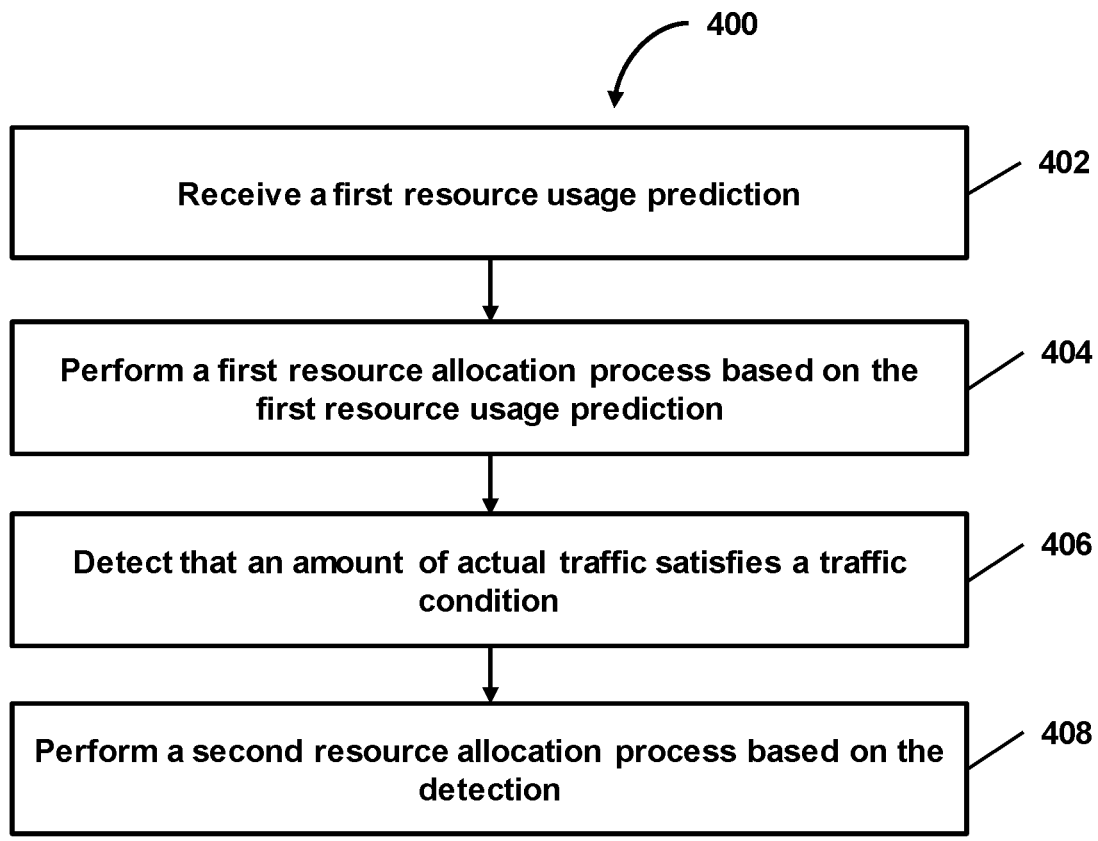
FIG. 4 shows a flowchart of a method for conserving computational resources by reducing network traffic predictions via machine learning models facilitating computing system resource allocations, in accordance with one or more embodiments.

FIG. 4 is an example flowchart of processing operations of a method 400 that enable the various features and functionality of the system as described in detail above. The processing operations of the method presented below are intended to be illustrative and non-limiting. In some embodiments, for example, the method may be accomplished with one or more additional operations not described, and/or without one or more of the operations discussed. Additionally, the order in which the processing operations of the method are illustrated (and described below) is not intended to be limiting.

In some embodiments, the method may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

In an operation 402, a first resource usage prediction may be received. For example, in connection with a first scheduled time for automated triggering of network resource usage predictions via a first machine learning model at scheduled times, the system may receive, via the first machine learning model, a first resource usage prediction for a service executing within a computing environment. The first resource usage prediction may be a prediction as to an amount of resources are needed for a service, a particular resource that the service needs to execute, an amount of network traffic experienced by the service, or other resource usage-related prediction. The service may be any computational service. For example, the service may be a microservice, a thread of executable code, a software application, a portion of a software application, or other service. The service may execute within a computing environment, such as a cloud computing environment. Operation 402 may be performed by a subsystem that is the same as or similar to allocation subsystem 112, in accordance with one or more embodiments.

In an operation 404, a first resource allocation process may be performed based on the first resource usage prediction. For example, the system may perform a first resource allocation process for the service based on the first resource usage prediction. The first resource allocation process may allocate a set of resources to the service. For example, the first resource allocation process may be performed when the amount of predicted network traffic meets or exceeds a network traffic threshold of the service. For instance, when the amount of predicted network traffic meets or exceeds the network traffic threshold for the service, the system may allocate an additional resource (e.g., a task) to the service. Operation 404 may be performed by a subsystem that is the same as or similar to allocation subsystem 112, in accordance with one or more embodiments.

In an operation 406, an amount of actual traffic that satisfies a traffic condition may be detected. For example, the system may detect that an amount of actual traffic corresponding to the service satisfies a traffic threshold for a threshold amount of time. For instance, the system may actively monitor network traffic experienced by the service to determine whether the amount of network traffic satisfies a traffic threshold for the threshold amount of time. The traffic threshold may be a predetermined amount of network traffic, and the threshold amount of time may be a predetermined threshold time period (e.g., 1 minute, 2 minutes, 3 minutes, etc.). When the amount of network traffic (e.g., actual network traffic) is sustained for the predetermined threshold time period, the system may detect that the amount of actual traffic corresponding to the service satisfies the traffic threshold for the threshold amount of time. Operation 406 may be performed by a subsystem that is the same as or similar to detection subsystem 118, in accordance with one or more embodiments.

In an operation 408, a second resource allocation process may be performed based on the detection. For example, in connection with detecting that the amount of actual traffic satisfies the traffic threshold for the threshold amount of time, the system may perform, before a second scheduled time next in the scheduled times after the first scheduled time, a second resource allocation process for the service. The second resource allocation process may allocate an additional set of resources to the service. For example, the second resource allocation process may allocate an additional set of tasks for the service. Operation 408 may be performed by a subsystem that is the same as or similar to allocation subsystem 112, in accordance with one or more embodiments.

In some embodiments, the various computers and subsystems illustrated in FIG. 1 may include one or more computing devices that are programmed to perform the functions described herein. The computing devices may include one or more electronic storages (e.g., conversion database(s) 132, which may include training data database (s) 134, model database(s) 136, etc., or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein by subsystems 112-118 or other subsystems. The processors may be programmed to execute computer program instructions by software; hardware; firmware;

some combination of software, hardware, or firmware; and/or other mechanisms for configuring processing capabilities on the processors.

It should be appreciated that the description of the functionality provided by the different subsystems 112-118 described herein is for illustrative purposes, and is not intended to be limiting, as any of subsystems 112-118 may provide more or less functionality than is described. For example, one or more of subsystems 112-118 may be eliminated, and some or all of its functionality may be provided by other ones of subsystems 112-118. As another example, additional subsystems may be programmed to perform some or all of the functionality attributed herein to one of subsystems 112-118.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: in connection with a first scheduled time for automated triggering of network resource predictions via a first machine learning model at scheduled times, receiving, via the first machine learning model, a first resource usage prediction for a service executing within a computing environment; performing a first resource allocation process for the service based on the first resource usage prediction, the first resource allocation process allocating a set of resources to the service; detecting that an amount of actual traffic corresponding to the service satisfies a traffic threshold for a threshold amount of time; and in connection with detecting that the amount of actual traffic satisfies the traffic threshold for the threshold amount of time, performing, before a second scheduled time next in the scheduled times after the first scheduled time, a second resource allocation process for the service, the second resource allocation process allocating an additional set of resources to the service.

2. The method of the preceding embodiment, wherein the second resource allocation process comprises: parsing event logs associated with the service to determine whether a first number of resources executing within the computing environment matches a second number of resources; and in response to determining that the first number of resources matches the second number of resources, updating the second number of resources by adding one.

3. The method of embodiment 1, wherein the second resource allocation process comprises: parsing event logs associated with the service to determine whether a first number of resources executing within the computing environment is (i) less than a second number of resources and (ii) greater than one; and in response to determining that the first number of resources matches the second number of resources, updating the second number of resources by decreasing one.

4. The method of embodiment 1, wherein the second resource allocation process comprises: parsing event logs associated with the service to determine whether a first resource of the set of resources associated with the service satisfies a threshold time range; and in response to determining that the first resource satisfies the threshold time range, preventing the performance of the second resource allocation process until the second scheduled time next in the scheduled times after the first scheduled time.

5. The method of embodiment 1, wherein the second resource allocation process comprises: parsing event logs associated with the service to determine whether a first resource of the set of resources associated with the service satisfies a threshold time range; in response to the first resource failing to satisfy the threshold time range, determining, based on the parsing, whether a first amount of resources executing within the computing environment is less than a second number of resources; and in response to determining that the first amount of resources is less than the second number of resources, preventing the performance of the second resource allocation process until the second scheduled time next in the scheduled times after the first scheduled time.

6. The method of any of the preceding embodiments, wherein the threshold amount of time is a time period respective to an initial network traffic prediction corresponding to the receiving of the first resource usage prediction for the service.

7. The method of any of the preceding embodiments, wherein the traffic threshold is associated with a bound of an initial network traffic prediction.

8. The method of the preceding embodiment, wherein the traffic threshold is a value associated with a maximum of predicted network traffic of the initial network traffic prediction.

9. The method of embodiment 7, wherein the traffic threshold is a value associated with a minimum of predicted network traffic of the initial network traffic prediction.

10. The method of any of the preceding embodiments, wherein the first resource allocation process allocates a number of resources of the set of resources to execute on one or more virtual machines associated with the service.

11. The method of any of the preceding embodiments, wherein the second resource allocation process further comprises: providing (i) a first timestamp associated with the detection and (ii) a service identifier of the service to a second machine learning model, to generate a second resource usage prediction for the service executing within the computing environment, wherein the second resource usage prediction is for a time period that is less than a second time period between the scheduled times of the automated triggering of the network resource predictions via the first machine learning model; detecting whether a second amount of actual traffic corresponding to the service satisfies the traffic threshold for the threshold amount of time; and in connection with detecting that the second amount of actual traffic satisfies the traffic threshold for the threshold amount of time, performing a third resource allocation process for the service.

12. The method of any of the preceding embodiments, wherein the service is a network service.

13. The method of any of the preceding embodiments, wherein the first resource allocation process allocates a set of resources to a network service and wherein the second resource allocation process allocates a set of resources to the network service.

14. The method of the preceding embodiment, wherein the first resource allocation process is a first task allocation process allocating a set of instantiated tasks to the network service and wherein the second resource allocation process is a second task allocation process allocating a set of instantiated tasks to the network service.

15. The method of the preceding embodiment, wherein the set of instantiated tasks are instantiated within a cloud computing environment.

16. A tangible, non-transitory, machine-readable medium storing instructions that, when executed by a data processing apparatus, cause the data processing apparatus to perform operations comprising those of any of the foregoing method embodiments.

17. A system comprising: one or more processors; and memory storing instructions that, when executed by the processors, cause the processors to effectuate operations comprising those of any of the foregoing method embodiments.

What is claimed is:

1. A system for conserving computational resources by reducing network traffic predictions via machine learning models facilitating cloud computing system resource allocations, the system comprising:
   one or more processors executing computer program instructions that, when executed, cause operations comprising:
      in connection with automated periodic triggering of network traffic predictions via a first machine learning model at scheduled intervals, receiving, via the first machine learning model, an initial network traffic prediction for a network service executing within a cloud computing environment, and performing a first task allocation process for the network service based on the initial network traffic prediction, the first task allocation process allocating a set of instantiated tasks to the network service, the set of instantiated tasks being instantiated within the cloud computing environment;
      prior to a next scheduled interval of the automated periodic triggering, detecting whether an amount of actual network traffic experienced by the network service (i) exceeds an upper bound of the initial network traffic prediction and (ii) continuously satisfies a relative traffic threshold for a threshold time period, the relative traffic threshold being a different parameter from the upper bound and is relative the initial network traffic prediction; and
      in response to the amount of actual network traffic exceeding the upper bound of the initial network traffic prediction and continuously satisfying the relative traffic threshold for the threshold time period, executing a machine learning model to generate a subsequent network traffic prediction for the network service, and performing a second task allocation process for the network service based on the subsequent network traffic prediction, the second task allocation process allocating an additional set of instantiated tasks to the network service,
      wherein the machine learning model is not executed, to generate the subsequent network traffic prediction, in response to the amount of actual network traffic failing to exceed the upper bound of the initial network traffic prediction and failing to continuously satisfy the relative traffic threshold for the threshold time period.

2. The system of claim 1, wherein the second task allocation process comprises:
   parsing event logs associated with the network service to determine whether a predetermined desired number of instantiated tasks executing within the cloud computing environment matches a predetermined maximum number of instantiated tasks; and
   in response to determining that the predetermined desired number of instantiated tasks matches the predetermined maximum number of instantiated tasks, updating the maximum number of instantiated tasks by one task and adding at least one task of the additional set of instantiated tasks to execute within the cloud computing environment.

3. A method comprising:
   in connection with a first scheduled time for automated triggering of network resource predictions via a first machine learning model at scheduled times, receiving, via the first machine learning model, a first resource usage prediction for a service executing within a computing environment;
   performing a first resource allocation process for the service based on the first resource usage prediction, the first resource allocation process allocating a set of resources to the service;
   detecting that an amount of actual traffic corresponding to the service satisfies a traffic threshold for a threshold amount of time; and
   in connection with detecting that the amount of actual traffic satisfies the traffic threshold for the threshold amount of time, executing a machine learning model to generate a subsequent resource usage prediction for the service, and performing, based on the subsequent resource usage prediction, before a second scheduled time next in the scheduled times after the first scheduled time, a second resource allocation process for the service, the second resource allocation process allocating an additional set of resources to the service,
   wherein the machine learning model is not executed, to generate another resource usage prediction for the service, in connection with another amount of actual traffic, corresponding to the service, failing to satisfy the traffic threshold for the threshold amount of time.

4. The method of claim 3, wherein the second resource allocation process comprises:
   parsing event logs associated with the service to determine whether a first number of resources executing within the computing environment matches a second number of resources; and
   in response to determining that the first number of resources matches the second number of resources, updating the second number of resources by adding one.

5. The method of claim 3, wherein the second resource allocation process comprises:
   parsing event logs associated with the service to determine whether a first number of resources executing within the computing environment is (i) less than a second number of resources and (ii) greater than one; and
   in response to determining that the first number of resources matches the second number of resources, updating the second number of resources by decreasing one.

6. The method of claim 3, wherein the second resource allocation process comprises:
   parsing event logs associated with the service to determine whether a first resource of the set of resources associated with the service satisfies a threshold time range; and
   in response to determining that the first resource satisfies the threshold time range, preventing the performance of the second resource allocation process until the second scheduled time next in the scheduled times after the first scheduled time.

7. The method of claim 3, wherein the second resource allocation process comprises:
parsing event logs associated with the service to determine whether a first resource of the set of resources associated with the service satisfies a threshold time range;
in response to the first resource failing to satisfy the threshold time range, determining, based on the parsing, whether a first amount of resources executing within the computing environment is less than a second number of resources; and
in response to determining that the first amount of resources is less than the second number of resources, preventing the performance of the second resource allocation process until the second scheduled time next in the scheduled times after the first scheduled time.

8. The method of claim 3, wherein the threshold amount of time is a time period respective to an initial network traffic prediction corresponding to the receiving of the first resource usage prediction for the service.

9. The method of claim 3, wherein the traffic threshold is associated with a bound of an initial network traffic prediction.

10. The method of claim 9, wherein the traffic threshold is a value associated with a maximum of predicted network traffic of the initial network traffic prediction.

11. The method of claim 9, wherein the traffic threshold is a value associated with a minimum of predicted network traffic of the initial network traffic prediction.

12. The method of claim 3, wherein the first resource allocation process allocates a number of resources of the set of resources to execute on one or more virtual machines associated with the service.

13. The method of claim 3, wherein the second resource allocation process further comprises:
providing (i) a first timestamp associated with the detection and (ii) a service identifier of the service to a second machine learning model, to generate a second resource usage prediction for the service executing within the computing environment, wherein the second resource usage prediction is for a time period that is less than a second time period between the scheduled times of the automated triggering of the network resource predictions via the first machine learning model;
detecting whether a second amount of actual traffic corresponding the service satisfies the traffic threshold for the threshold amount of time; and
in connection with detecting that the second amount of actual traffic satisfies the traffic threshold for the threshold amount of time, performing a third resource allocation process for the service.

14. One or more non-transitory, computer-readable media storing instructions that, when executed by one or more processors, cause operations comprising:
in connection with a first scheduled time for automated triggering of network resource predictions via a first machine learning model at scheduled times, receiving, via the first machine learning model, a first resource usage prediction for a service executing within a computing environment;
performing a first resource allocation process for the service based on the first resource usage prediction, the first resource allocation process allocating a set of resources to the service;
detecting whether an amount of actual traffic corresponding to the service satisfies a traffic condition;
in response to the amount of actual traffic satisfying the traffic condition, executing a machine learning model to generate a subsequent resource usage prediction for the service, and performing, based on the subsequent resource usage prediction, before a second scheduled time next in the scheduled times after the first scheduled time, a second resource allocation process for the service,
wherein the machine learning model is not executed, to generate the subsequent resource usage prediction for the service, in response to the amount of actual traffic failing to satisfy the traffic condition.

15. The media of claim 14, wherein the second resource allocation process comprises:
parsing event logs associated with the service to determine whether a first number of resources executing within the computing environment matches a second number of resources; and
in response to determining that the first number of resources matches the second number of resources, updating the second number of resources by adding one.

16. The media of claim 14, wherein the second resource allocation process comprises:
parsing event logs associated with the service to determine whether a first number of resources executing within the computing environment is (i) less than a second number of resources and (ii) greater than one; and
in response to determining that the first number of resources matches the second number of resources, updating the second number of resources by decreasing one.

17. The media of claim 14, wherein the second resource allocation process comprises:
parsing event logs associated with the service to determine whether a first resource of the set of resources associated with the service satisfies a threshold time range; and
in response to determining that the first resource satisfies the threshold time range, preventing the performance of the second resource allocation process until the second scheduled time next in the scheduled times after the first scheduled time.

18. The media of claim 14, wherein the second resource allocation process comprises:
parsing event logs associated with the service to determine whether a first resource of the set of resources associated with the service satisfies a threshold time range;
in response to the first resource failing to satisfy the threshold time range, determining, based on the parsing, whether a first amount of resources executing within the computing environment is less than a second number of resources; and
in response to determining that the first amount of resources is less than the second number of resources, preventing the performance of the second resource allocation process until the second scheduled time next in the scheduled times after the first scheduled time.

19. The media of claim 14, wherein the traffic condition indicates a threshold amount of network traffic experienced over a time period respective to an initial network traffic prediction associated with the first resource usage prediction.

20. The media of claim 14, wherein the second resource allocation process further comprises:
- providing (i) a first timestamp associated with the detection and (ii) a service identifier of the service to a second machine learning model, to generate a second resource usage prediction for the service;
- detecting whether a second amount of actual traffic corresponding to the service satisfies the traffic condition; and
- in response to the second amount of actual traffic satisfying the traffic condition, performing a third resource allocation process for the service.

\* \* \* \* \*